(12) United States Patent
Suzuki et al.

(10) Patent No.: US 6,834,771 B2
(45) Date of Patent: Dec. 28, 2004

(54) RESIN COMPONENT WELDING STRUCTURE

(75) Inventors: Keiji Suzuki, Ibaraki-ken (JP);
Nobuharu Muto, Ibaraki-ken (JP)

(73) Assignee: Kyosan Denki Co., Ltd., Sashima-gun (JP)

( * ) Notice: Subject to any disclaimer, the term of this patent is extended or adjusted under 35 U.S.C. 154(b) by 47 days.

(21) Appl. No.: 10/281,116

(22) Filed: Oct. 28, 2002

(65) Prior Publication Data

US 2004/0079752 A1 Apr. 29, 2004

(51) Int. Cl.[7] .............................................. F16K 17/36
(52) U.S. Cl. ..................... 220/361; 220/62.22; 137/202
(58) Field of Search ................................. 220/303, 304, 220/795, 345.6, 803, 806, 804, 378, 62.22, 694; 137/202, 43, 587; 200/361

(56) References Cited

U.S. PATENT DOCUMENTS

| | | | |
|---|---|---|---|
| 5,139,043 A | | 8/1992 | Hyde et al. |
| 5,443,098 A | | 8/1995 | Kertesz |
| 5,756,168 A | * | 5/1998 | Maag ........................ 428/34.1 |
| 5,782,262 A | * | 7/1998 | Kim ............................ 137/202 |
| 6,093,462 A | * | 7/2000 | O'Herron et al. ........... 428/35.2 |
| 6,189,567 B1 | * | 2/2001 | Foltz ............................ 137/587 |
| 6,332,555 B1 | * | 12/2001 | Stangier ...................... 220/562 |
| 6,408,867 B2 | | 6/2002 | Aoki et al. |
| 6,431,200 B2 | | 8/2002 | Brock et al. |
| 6,516,964 B1 | * | 2/2003 | Gerhardt et al. ........... 220/4.14 |

FOREIGN PATENT DOCUMENTS

| | | |
|---|---|---|
| DE | 296 04 289 U1 | 5/1996 |
| DE | 295 02 114 U1 | 6/1996 |
| EP | 0 947 368 A2 | 10/1999 |
| EP | 1 211 196 A1 | 6/2000 |
| JP | A 6-270701 | 9/1994 |
| JP | A 10-71861 | 3/1998 |

* cited by examiner

*Primary Examiner*—Joseph Man-Fu Moy
(74) *Attorney, Agent, or Firm*—Oliff & Berridge, PLC

(57) ABSTRACT

A welding structure for a fuel tank including a resin inner shell and a resin outer shell interposed by a fuel permeation prevention layer such that they are laminated, and a resin component attached to the fuel tank. The resin component includes a body formed from a resin having low permeability to hydrocarbon gases, a packing material having low permeability to hydrocarbon gases which is fixed to the body, and a resin which is insert molded to at least a connecting portion of the body that connects with a connecting portion of the fuel tank, and which can be welded to the fuel tank.

10 Claims, 7 Drawing Sheets

RESIN COMPONENT WELDING STRUCTURE

INCORPORATION BY REFERENCE

The disclosure of Japanese Patent Application No. 2000-271303 filed on Sep. 7, 2001, including the specification, drawings and abstract is incorporated herein by reference in its entirety.

BACKGROUND OF THE INVENTION

1. Field of the Invention

The invention relates to a welding structure for a resin component which allows reliable attachment of the component to a fuel tank and also inhibits leakage of fuel, or the like, within the fuel tank.

2. Description of Related Art

There is great demand for improvement in the air tightness of fuel tank systems for fuel tanks, and in particular, for fuel tanks of automobiles, in order to suppress emissions of hydrocarbon gases into the surrounding environment, at times of both running and stopping. In order to improve the sealing of the entire fuel tank system in this manner, a key problem which must be solved is reducing the amount of hydrocarbon gases that leaks from the fuel tank itself, as well as from each component part attached directly or indirectly to the fuel tank, or in other words, from the points, and so forth, to which, for example, a connecting pipe, a valve member, a pump or a filter are attached.

Furthermore, in order to bring about both weight reduction and cost reduction of automobiles, plasticization of fuel tanks has been promoted. At present, fuel tanks made from a high-density polyethylene resin that offers good corrosion prevention and is light weight have become mainstream. Moreover, in line with this, endeavors have also been made to plasticize each component attached directly and indirectly to the fuel tank. As a result, in order to make attachment to the fuel tank easy, the same resin material has been utilized in the attachment portion of each component and the fuel tank, and a method for connecting them using thermal welding has been adopted.

In light of these circumstances, the components described hereinafter are commonly used for fuel tanks and resin components attached to fuel tanks.

In order to achieve fuel tank weight reduction, the fuel tank is integrally molded by blow molding with resin. High density polyethylene resin (HDPE) is utilized since it is suitable for blow molding and offers excellent affordability and shock resistance. However, this high density polyethylene resin is known to permeate small amounts of hydrocarbon gases. Even though this permeation is limited, some sort of countermeasure to address it is desirable in order to respond to rising concerns regarding recent environmental pollution issues. The laminated structure of the fuel tank wall shown in FIG. 12 has been proposed as a countermeasure.

In the figure, a fuel tank a is composed from a five layer structure that fundamentally includes a three layer structure having an inner shell b forming an inside portion of the tank, an outer shell c forming an outer portion of the tank, and a barrier layer d interposed between the shells b and c which prevents permeation of hydrocarbon gases. Bonding layers e, e are sandwiched between the barrier layer d and both of the shells b and c, respectively, in order to facilitate even stronger bonding of the respective resins.

More particularly, the inner shell b and the outer shell c use known high density polyethylene resin, and the bonding layers e, e use a highly advanced modified high density polyethylene resin having adhesive properties (this resin has adhesive properties and permeates hydrocarbon gases). The barrier layer d adopts a resin that prevents permeation by hydrocarbon gases, such as EVOH resin (EVAL) made by Kuraray Co., Ltd. Hydrocarbon gas emissions are suppressed very well using fuel tanks of this type.

A valve, intended as a part to be attached to a fuel tank, which is light and can be attached to the fuel tank and which reduces leakage of fuel, is disclosed in Japanese Patent Laid-Open Publication No. 10-71861. This valve is shown in FIG. 13. This invention relates to a fuel leakage prevention valve for preventing leakage of fuel from a fuel tank, which occurs when an automobile turns over, or such like.

In this invention, a resin part p includes a valve cylinder portion q and an attachment portion r, these members being formed, respectively, from different materials. The valve cylinder portion q is formed from a polyacetal resin possessing great rigidity and capable of being formed with high dimensional accuracy, and includes a disk portion h which is integrally insert molded with an attachment portion r, and a valve cylinder g housing a fuel leakage prevention valve f. The attachment portion r is formed from the same high density polyethylene resin material as the fuel tank a, and has a flange j formed in an abutting portion which abuts against the fuel tank a. Furthermore, a pipe portion k connecting with a connection pipe m is formed on an opposite side of the attachment portion r to the flange j. In addition, a resin component p is composed from the valve cylinder portion q and the attachment portion r which are integrally formed by placing the disk portion h of the valve cylinder portion q in the die, and insert molding the attachment portion. The integrally formed valve cylinder portion q and the attachment portion r are strongly fixed by thermal welding an upper surface of the fuel tank a and a lower surface of the flange j of the attachment portion r, when the valve cylinder g is inserted in an open portion i of the fuel tank a.

However, as a result of the valve cylinder portion q and the attachment portion r being formed from different resins, even if both the valve cylinder portion q and the attachment portion r are integrally molded, there is a chance that a gap will emerge between the valve cylinder portion q and the attachment portion r due to vibrations caused by use, contractions due to temperature variation, deterioration with time, or the like, during usage after molding. In theory, the valve should function so as to prevent leakage of fuel from the tank, when the car turns over, or the like. However, if a gap is generated, fuel may leak at such times.

As well as this, since the attachment portion r is formed from the same high density polyethylene resin material as the fuel tank a, hydrocarbon gases can permeate through the attachment portion and are released to the outside.

Moreover, in Japanese Patent Laid-open No. HEI. 6-270701 a resin component, namely, a connection pipe, is disclosed. This connection pipe, as shown in FIG. 14, is formed from a first member s made from a polyamide resin, and a second member t made from a modified high density polyethylene resin. As a result of forming the second member t from the modified high density polyethylene resin, a flexible pipe is provided, and as well as this, attachment to the fuel tank can be executed with greater ease. Furthermore, since the second member t possesses cohesive properties, connection with the connecting portion w of the first member s is improved.

However, according to this structure, the second member t is formed from high density polyethylene resin. As a result, hydrocarbon gases permeate through the second member t and are released to the outside.

SUMMARY OF THE INVENTION

It is an object of the invention to provide a welding structure for a resin component which inhibits leakage of fuel and hydrocarbon gases from the resin component connected to a fuel tank.

In order to achieve the above object, a welding structure according to a first aspect of the invention is structured such that, a fuel tank having a resin inner shell and a resin outer shell which are interposed by a fuel permeation prevention layer so as to be laminated, is welded to a resin component for attachment to the fuel tank. The resin component includes a body formed of a resin having low permeability to hydrocarbon gases, a packing material having low permeability to hydrocarbon gases which is fixed to the body, and a resin which is insert molded to at least a connecting portion of the body which connects with a connecting portion of the tank, and which is weldable to the fuel tank.

According to the first aspect, the fuel tank and the resin component are firmly fixed. Furthermore, leakage of fuel and permeation of hydrocarbon gases is reduced.

According to the first aspect, the packing material may be fixed by locking rings formed from the same resin as the insert molded resin. If such a structure is adopted, the seal of the layer interface of the body of the resin component and the insert molded resin is improved. As a result, for example, even if the interface connection of the elements to the upstream side of the packing material is inadequate (for example, the interface of the flange and the resin), or there is separation due to deterioration over time, and thus fuel leakage may potentially occur, fuel is reliably inhibited from leaking to the downstream side of the packing material because of the location of the packing material.

Moreover, a plurality of packing materials may be provided, thus making it possible to prohibit leakage of fuel with even greater reliability.

In addition, according to the first aspect, a concave and recess portion may be provided on a surface of the connecting portion side of the body that connects with the fuel tank, and the packing material may be provided in the recess portion. If such a structure is adopted, it is possible to inhibit leakage of fuel with even greater reliability due to the combined effect of the packing material and the concave and recess portion.

In a welding structure according to a second aspect of the invention, a fuel tank having a resin inner shell and a resin outer shell which are interposed by a fuel permeation prevention layer such that they are laminated, is welded to a resin component for attachment to the fuel tank. The resin component includes a body formed of a resin having low permeability to hydrocarbon gases, a protruding portion formed in a surface of a connecting portion side of the body that connects with the fuel tank and which penetrates into the outer shell of the fuel tank during attachment to the fuel tank, and a resin which is insert molded to at least a connecting portion of the body that connects with a connecting portion of the tank, and which is moldable to the fuel tank.

According to the second aspect, the fuel tank and the resin component are firmly fixed. Furthermore, leakage of fuel and permeation of hydrocarbon gases is reduced, and the size of a connecting surface between the fuel tank and the resin component is reduced. As a result, weigh reduction is achieved and production costs are reduced.

Furthermore, according to the second aspect, the protruding portion may penetrate into a bonding layer laminated on the upper surface of the fuel permeation prevention layer. In addition, if this structure is adopted, the protruding portion bonds with a bonding layer, thus preventing separation of the layer interfaces at this location. As a result, permeation of hydrocarbon gases is reduced and furthermore, leakage of fuel is reliably inhibited.

Moreover, according to the second aspect, the protruding portions may be inserted as far as the fuel permeation prevention layer. If this structure is adopted, the protruding portions extend as far as a barrier layer, and thus both fuel leakage due to layer interface separation, and permeation of hydrocarbon gases are inhibited.

Furthermore, the second aspect may include the packing material having low permeability to hydrocarbon gases which is fixed to the body. Accordingly, permeation of hydrocarbon gases is reduced, the area of the connecting surface of the fuel tank and the resin component is reduced, and as a result it is possible to reduce production costs and achieve weight reduction.

According to the second aspect, the packing material may be fixed by locking rings formed from the same resin as the insert molded resin. If this packing material is adopted, the seal of the interface between the body of the component and the insert molded resin is improved. As a result, even if the interface connection of the elements to the upstream side of the packing material is inadequate (for example, the interface of the flange and the resin), or there is separation due to deterioration over time, and thus fuel leakage may potentially occur, fuel is reliably inhibited from leaking to the downstream side of the packing material. Furthermore, it is also possible to inhibit permeation of hydrocarbon gases.

DETAILED DESCRIPTION OF PREFERRED EMBODIMENTS

Figure 1:
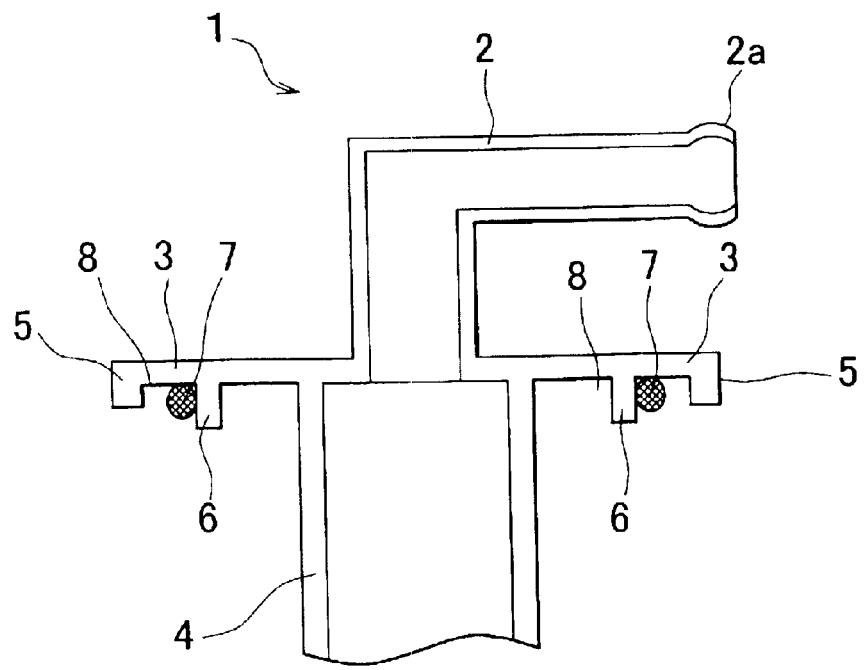
FIG. 1 is a cross sectional view showing a body of a component for attachment to a fuel tank to which low permeability packing material has been attached, according to a first embodiment of the invention.
Figure 2:
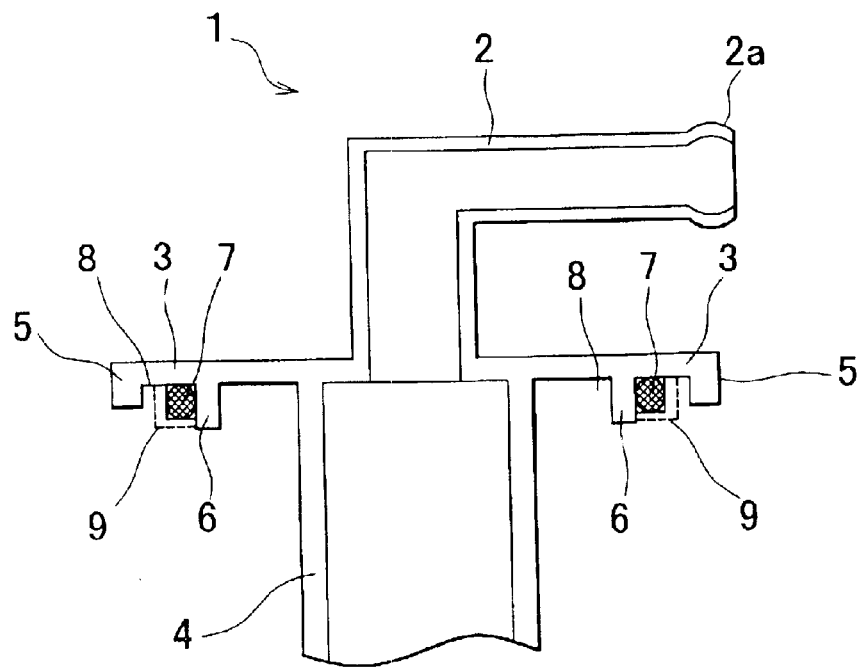
FIG. 2 is a cross sectional view showing the component in a state where a locking ring fixes the low permeability packing material.
Figure 3:
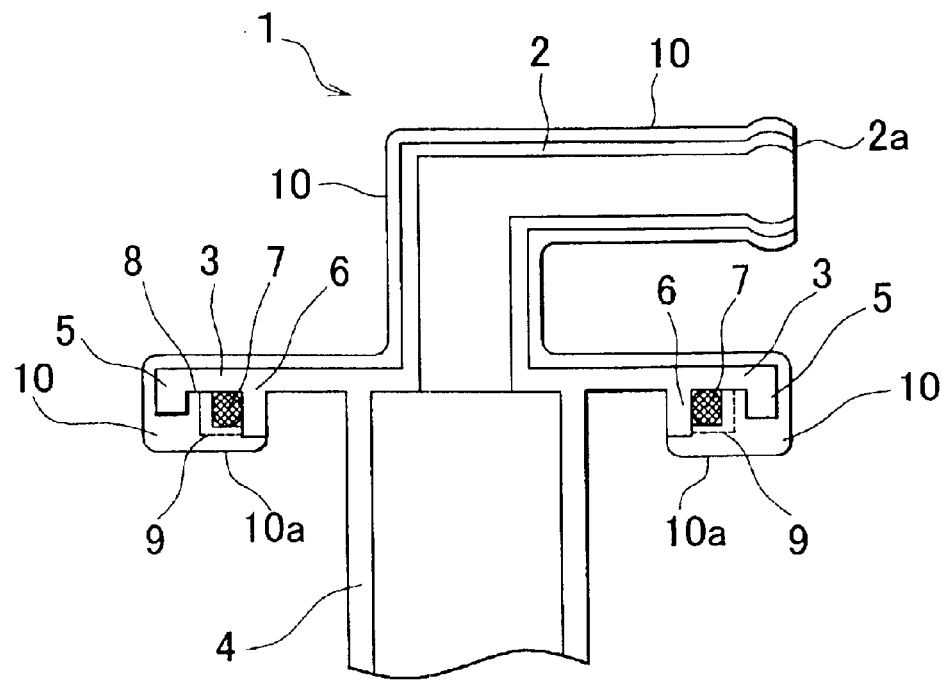
FIG. 3 is a cross sectional view showing the component in a state following insert molding using the same material as the fuel tank.
Figure 4:
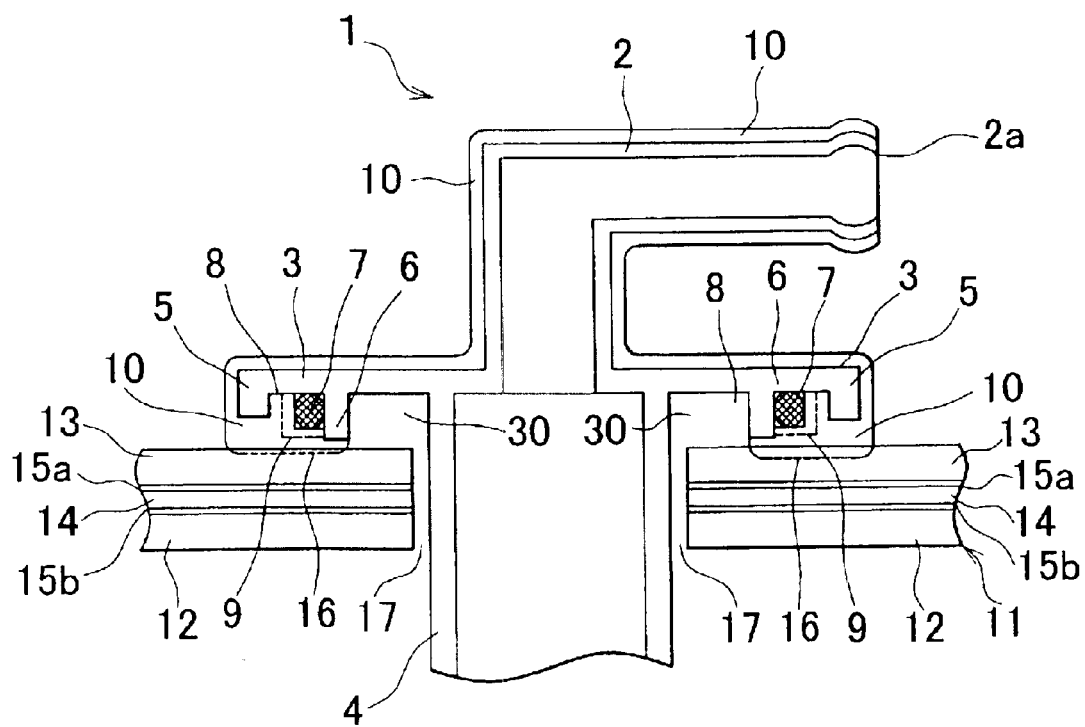
FIG. 4 is a cross sectional view showing the component for attachment to the fuel tank (the same component as in FIG. 3) in a state where it has been thermal welded to the fuel tank, according to the first embodiment of the invention.
Figure 5:
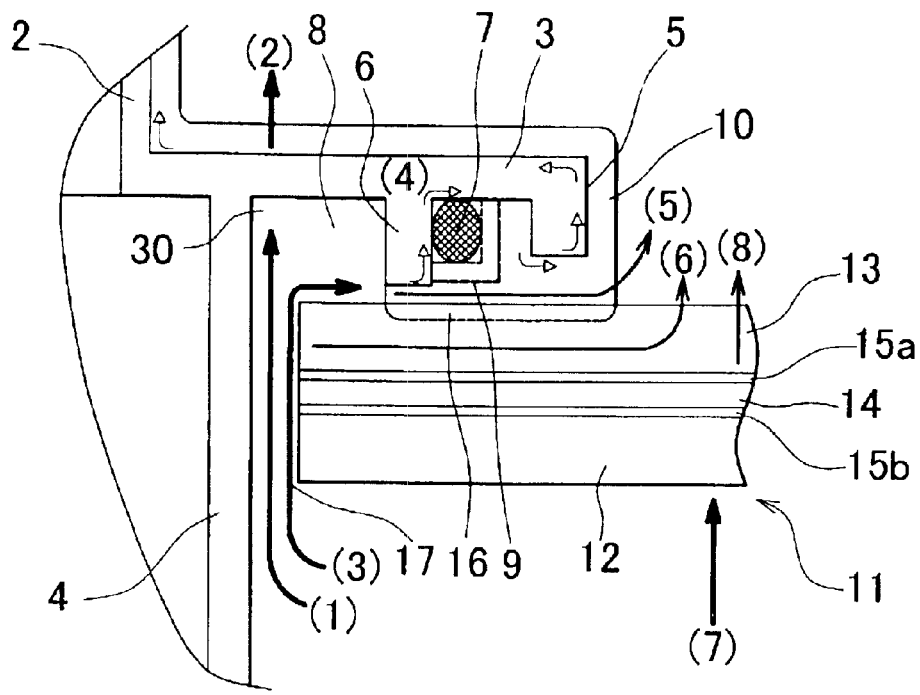
FIG. 5 is an enlarged cross sectional view of one part of the component showing a diagrammatic sketch of the flows of fuel and hydrocarbon gases.
Figure 6:
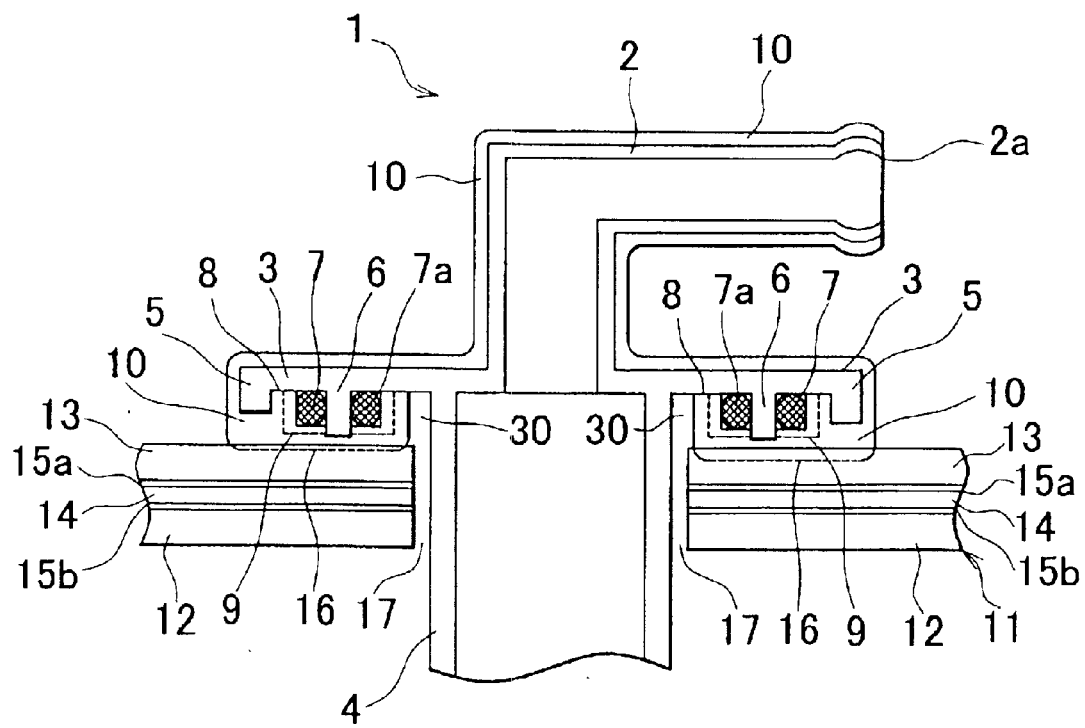
FIG. 6 is a cross sectional view showing a modified form of the embodiment in FIG. 4, in a state where a plurality of low permeability packing materials have been attached.
Figure 7:
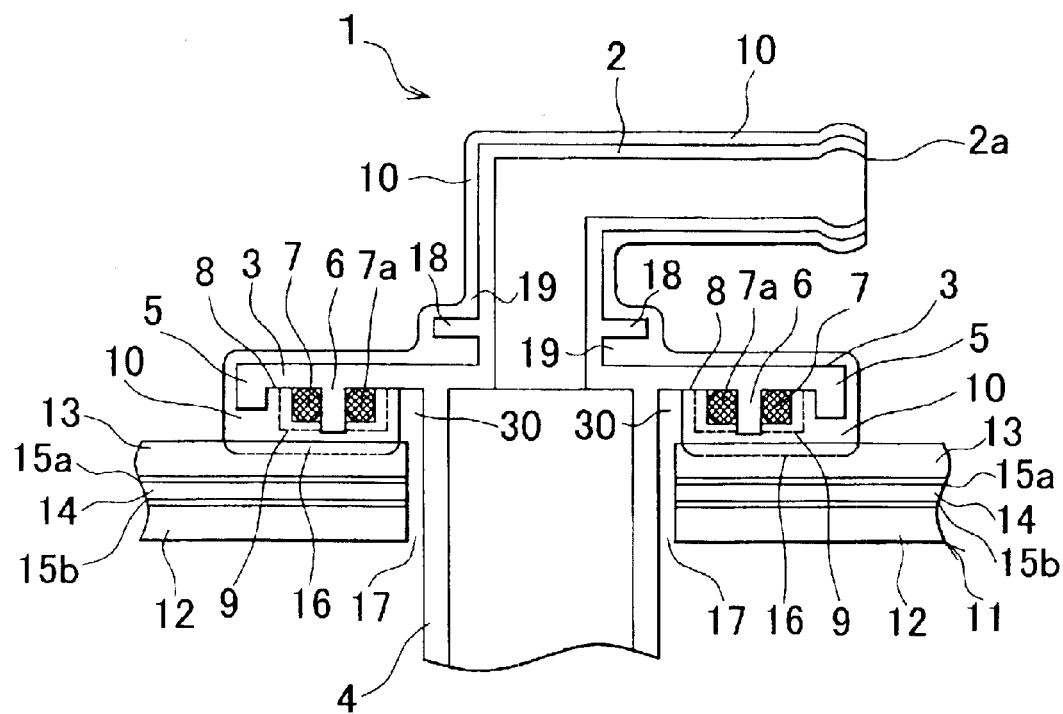
FIG. 7 is a cross sectional view showing a further modified form of the embodiment in FIG. 4, in a state where a concave and recess portion has been provided in a side portion of the body of the component.

FIG. 1 to FIG. 7 show a welding structure for a resin component according to a first embodiment of the invention. FIG. 1 is a cross sectional view showing a body of the component for attachment to a fuel tank in a state where low permeability packing material has been attached. FIG. 2 is a cross sectional view showing the component in a state where a locking ring fixes the low permeability packing material. FIG. 3 is a cross sectional view showing the component in a state following insert molding using the same material as the fuel tank. FIG. 4 is a cross sectional view showing the component in a state where it has been thermal welded to the fuel tank. FIG. 5 is an enlarged cross sectional view of one part of the component in FIG. 4 showing a diagrammatic sketch of the flows of fuel and hydrocarbon gases. FIG. 6 is a cross sectional view showing the component in a state where a plurality of low permeability packing materials have been attached. FIG. 7 is a cross sectional view of the component in a state where a concave and recess portion has been provided in a side portion of the body of the resin component.

The resin component according to the invention, is a component for attachment to a fuel tank, such as, for example, a connection pipe, or a case member housing a valve member, a pump, a filter, and the like. This resin component includes, if it is the connecting pipe, the entire attachment portion of the pipe portion and the fuel tank; and in the case that the resin part is the case member housing the valve member, the pump, the filter, and the like, it includes the attachment portion of the pipe portion, the fuel tank, and the case member housing the valve member, the pump, the filter, and the like.

FIG. 1 to FIG. 4 show an outline of the procedure (order) for attaching the body of the resin component to the fuel tank. As shown in FIG. 1 to FIG. 4, a body 1 is integrally formed. The body 1 is formed from a material which is not easily permeated by hydrocarbons such as polyamide (PA), polyphenylene sulfide (PPS), poly buthylene terephthalete (PBT), polyacetal (POM), or the like. This body 1 has, in all of the embodiments, a cylinder portion capable of housing and locating the valve body member, the pump, the filter, and the like. However, the body 1, may simply be a member like a connecting pipe which does not have a cylinder portion.

The body 1 is integrally formed from a pipe portion 2 connected to a connecting pipe, not shown, at a tip 2a of the pipe portion 2, a flange 3 having a welding portion for welding to the fuel tank at a lower surface of the body 1, and a cylindrical portion 4 disposed vertically from a center of a lower surface of the flange 3 which houses and locates members such as the valve member being a fuel tank cut valve, or the like, the pump, and the filter body. Furthermore, a ring shaped outer rib 5 and a ring shaped inside rib 6 are vertically formed in the lower surface of the flange 3. The outer rib 5 and the inside rib 6 form a ring shaped concave and recess portion 8 in the lower surface of the flange 3. The outer rib 5 and the inside rib 6 are beneficial for effective joining of attached packing material and the insert molded resin and the flange 3.

In addition, a packing material 7 being an O-ring, or the like, is wedged next to an outer side of the inside rib 6 provided in the lower surface of the flange 3. This packing material 7 is formed from a material, for example, fluororubber, which is not easily permeated by hydrocarbon gases, and is attached by press fitting to the lower surface of the flange 3 and a side face of the inside rib 6, thus creating a seal and reliably preventing fuel leakage. Furthermore, the outer rib 5 and the inside rib 6 are not indispensable elements of the structure. In the case that the outer rib 5 and the inside rib 6 are not formed, a means for provisionally holding the packing material 7, such as, for example, a means using adhesive material, can be used. Moreover, if a recess shape matching with the external shape of the packing material 7 is provided in the lower surface of the flange 3 and the side surface of the inside rib 6 which abut against the packing material 7, it is possible to improve the sealing effect still further.

FIG. 2 shows the body 1 in the state shown in FIG. 1, to which a ring shaped locking ring 9 has been fixed by pressure fitting, in order to firmly fix the low permeability packing material 7. The locking ring 9 is formed from the same high density polyethylene resin material as the fuel tank, and is integrated with insert molded resin by insert molding the high density polyethylene resin to an outer peripheral portion of the locking ring 9. As a result, the packing material 7 is firmly and strongly fixed, without looseness, to the lower surface of the flange 3 by pressure fitting.

FIG. 3 shows the body 1 in the state shown in FIG. 2, insert fitted with an insert molded resin 10 formed from the same high density polyethylene resin material as the fuel tank, around a top of an outer periphery of the body 1. The insert molded resin 10 shown in FIG. 3 is provided such that it extends around almost the entire circumference of the body 1. However, the insert molded resin 10 may be provided such that it principally makes welding between the body 1 and the fuel tank easier. In other words, the insert molded resin 10 may be provided around the lower surface of the flange 3 only, or around only a welding portion 10a being a portion of the lower surface of the flange 3 which welds to a fuel tank 11. Furthermore, in FIG. 3, the locking ring 9 is indicated by a dotted line. However, in reality there is no boundary between the locking ring 9 and the insert molded resin 10, since they are integrated by insert molding of the insert molded resin 10.

Next, FIG. 4 shows the body 1 formed in this manner, in a state where it has been thermal bonded to the fuel tank 11. The fuel tank 11 has a laminated structure similar to the know fuel tank that was previously described. Namely, the fuel tank 11 is fundamentally composed from a five layer structure including an inner shell 12 forming an inside portion of the fuel tank 11, an outer shell 13 forming an outer portion of the fuel tank 11, a barrier layer 14 interposed between the shells 12 and 13 which prevents permeation of hydrocarbon gases, an upper bonding layer 15a sandwiched between the inner shell 12 and the barrier layer 14, and a lower bonding layer 15b sandwiched between the outer shell 13 and the barrier layer 14.

More specifically, the inner shell 12 and the outer shell 13 are formed from a known high density polyethylene resin, and the upper bonding layer 15a and the lower bonding layer 15b are formed from a modified high density polyethylene resin having adhesive properties which was developed by improvement of high density polyethylene resin (this resin has adhesive properties and permeates hydrocarbon gases). In addition, the barrier layer 14 adopts a resin that prevents permeation by hydrocarbon gases, such as EVOH resin (EVAL) made by Kuraray Co., Ltd. Countermeasures for hydrocarbon gases proceed adequately using the fuel tank 11 configured in this manner. As shown in FIG. 5, the hydrocarbon gases within the fuel tank 11 permeate into the inner shell 12 of the fuel tank 11 in the direction indicated by a black arrow (7). However, the barrier layer 14 inhibits permeation, and thus only negligible amounts of hydrocarbon gases are released to the outside in the direction indicated by a black arrow (8).

The thermal welding of the fuel tank 11 and the body 1 shown in FIG. 3 is executed in the following manner. The cylindrical portion 4 of the body 1 is inserted within an opening 17 provided on the fuel tank 11 such that a welding portion 16 of the fuel tank 11 and a welding portion 16 of the body 1 are adjacent to each other. Next, a hot plate, not shown, is inserted between the welding portion 16 of the body 1 and the welding portion 16 of the fuel tank 11, thus heating both of the welding portions 16. When the welding portions 16 have been heated such that welding is possible, the hot plate is removed, and the body 1 is pressed onto the fuel tank 11 in order to weld and join both the body 1 and the fuel tank 11. The dotted line of the welding portions 16 in FIG. 5, indicates the welding portion 10a of the fuel tank 11 prior to welding (refer to FIG. 3). It goes without saying that this welding and joining may also be accomplished using methods other than a hot plate, such as, for example, vibration welding or ultrasonic welding.

It is possible to inhibit both fuel leakage and permeation of hydrocarbon gases by adopting this type of welding structure in the embodiment. A description will be given with reference to FIG. 5.

The structure for inhibiting the release of hydrocarbon gases within the fuel tank 11 via the wall of the fuel tank 11 has already been explained using the black arrows (7) and (8). Furthermore, the body 1 is formed from a resin having low permeability to hydrocarbon gases, and thus there is hardly any permeation and release of hydrocarbon gases through the body 1. In addition, with regard to the welding of the body 1 and the fuel tank 11, if, for example, the welding portion 10a of the body 1 and the fuel tank 11 use the same resin, the body 1 and the fuel tank 11 are such that they are almost completely integrated following welding thus preventing separation thereinafter. This inhibits fuel leakage from these (welded) points.

However, since the gap between the cylindrical portion 4 of the body 1 and the opening 17 of the fuel tank 11 is not sealed, fuel and hydrocarbons gases within the fuel tank 11 leak out from the opening 17 by the route indicated by black arrows (1) and (3), and are discharged into an upper space 30 which is the space above. In addition, hydrocarbon gases which have reached the upper space 30 by the route indicated by the black arrow (1), permeate through the body 1 and leak out by the route indicated by a black arrow (2). However, since the body 1 is formed from low permeability resin as previously described, the amount of leakage by the route indicated by the black arrow (2) is negligible. It should be noted that, the black arrows and the white arrows shown in FIG. 5 are diagrammatic representations indicating flows of hydrocarbon gases and fuel, respectively.

However, since the body 1 and the insert molded resin 10 are formed from different resins as described previously, even if, for example, both are firmly joined by insert molding, vibrations, differences in contraction rates when subjected to temperature variation, deterioration with time, or the like, can sometimes cause separation of the body 1 and the insert molded resin 10. In this case, the fuel which leaks to the upper space 30 via the route indicated by the black arrow (3), flows in the direction indicated by a white arrow (4) through the portion of the body 1 and the insert molded resin 10 that has separated, and is released to the outside. However, by positioning the packing material 7 in this route and forming the concave and recess portion 8, it is possible to prevent leakage from the rear side of the packing material 7. However, since the insert molded resin 10 allows permeation by hydrocarbon gases as previously described, hydrocarbon gases leak out by permeating along the route indicated by a black arrow (5). In addition, since the outer shell 13 of the fuel tank 11 also allows permeation by hydrocarbon gases, hydrocarbon gases leak out by permeating along the route indicated by the black arrow (6). However, the amount of such hydrocarbon gases is insignificant.

FIG. 6 shows a modified form of the embodiment in FIG. 4. The low permeability packing material 7 has been attached, and, moreover, a plurality of packing materials 7a (in this embodiment only one packing material 7a is provided) composed from O-rings are attached to the inside rib 6 of the lower surface of the flange 3. As a result of attaching these packing materials 7 and 7a in combination with the concave and recess portion 8 on the lower surface of the flange 3, it is possible to improve the sealing effect still further.

FIG. 7 shows another modified form of the embodiment in FIG. 6, in which ring shaped rib 18 has been formed in a side wall portion of the pipe portion 2 of the body 1. By providing the ring shaped rib 18 in the side wall portion of the pipe portion 2, the concave and recess portion 19 is formed in the side wall portion. Accordingly, even if it is tentatively assumed that fuel leaks as far as the side wall portion of the pipe portion 2 along the route indicated by the white arrow (4) in FIG. 5, all leakage to the rear side from this position can be prevented by the concave and recess portion 19.

Figure 8:
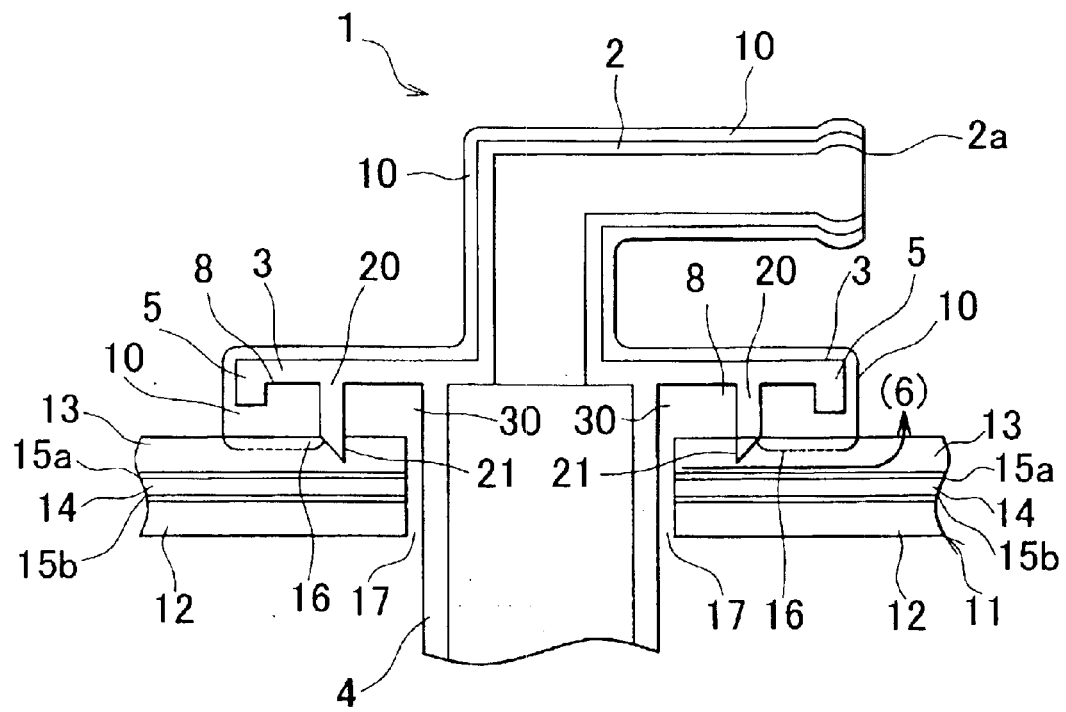
FIG. 8 is a cross sectional view showing a component for attachment to a fuel tank, in a state where the component has been thermal bonded to the fuel tank, according to another embodiment of the invention.

FIG. 8 shows the welding structure of the resin component according to a second embodiment of the invention. This second embodiment replaces the packing material adopted in the first embodiment shown in FIG. 4, with a protruding portion formed by modifying the inside rib, which performs the same functional role as the packing material. All other structural details are the same.

The body 1 is formed from a material which is not easily permeated by hydrocarbons such as polyamide (PA), polyphenylene sulfide (PPS), poly butylene terephthalete (PBT), polyacetal (POM), or the like. The body 1 is integrally formed from the pipe portion 2 connected to the connecting pipe, not shown, at the tip 2a of the pipe portion 2, the flange 3 having a welding portion for welding to the fuel tank at the lower surface of the body 1, and the cylindrical portion 4 disposed vertically from the center of the lower surface of the flange 3 which houses and locates members such as the valve member being a fuel tank cut valve, or the like, the pump, and the filter body.

The ring shaped outer rib 5 and ring shaped protruding portion 20 are formed vertically from the lower surface of the flange 3, and thus the concave and recess portion 8 is formed by the outer rib 5 and the protruding portion 20 on the lower surface of the flange 3. Furthermore, in contrast to the bottom surfaces of the outer rib 5 which is substantially flat, a tip 21 of the protruding portion 20 is pointed. The cross section of the tip 21 assumes a wedge shape. Furthermore, the tip 21 is insert molded such that it protrudes in an outward direction from the insert molded resin even after insert molding has been completed. The outer rib 5 and the protruding portion 20 are beneficial for effective joining of the insert molded resin and the flange 3.

For example, the insert molded resin 10 formed from the same high density polyethylene resin material as the fuel tank is provided using insert molding around the outer periphery of the body 1. The insert molded resin 10 shown in FIG. 8 is provided such that it extends around almost the entire circumference of the body 1. However, the insert molded resin 10 may be provided around only the lower surface of the flange 3, or around only the welding portion 16 which is a portion of the lower surface of the flange 3, such that welding of the body 1 and the fuel tank is easier.

The fuel tank 11 has the same laminated structure as the first embodiment previously described. Namely, the fuel tank 11 is fundamentally composed from a five layer structure including the inner shell 12 forming the inside portion of the fuel tank 11, the outer shell 13 forming the outer portion of the fuel tank 11, the barrier layer 14 interposed between the shells 12 and 13 which prevents permeation of hydrocarbon gases, the upper bonding layer 15a sandwiched between the inner shell 12 and the barrier layer 14, and the lower bonding layer 15b sandwiched between the outer shell 13 and the barrier layer 14.

More specifically, the inner shell 12 and the outer shell 13 are formed from a known high density polyethylene resin, and the upper bonding layer 15a and the lower bonding layer 15b are formed from a modified high density polyethylene resin having adhesive properties which was developed by improvement of high density polyethylene resin (this resin has adhesive properties and permeates hydrocarbon gases). In addition, the barrier layer 14 adopts a resin that prevents permeation by hydrocarbon gases, such as EVOH resin (EVAL) made by Kuraray Co., Ltd.

The welding of the fuel tank 11 and the body 1 is executed in the following manner. The cylindrical portion 4 of the body 1 is inserted within the opening 17 provided on the fuel tank 11 such that the welding portion 16 of the fuel tank 11 and the welding portion 16 of the body 1 are adjacent to each other. Next, the hot plate, not shown, is inserted between the welding portion 16 of the body 1 and the welding portion 16 of the fuel tank 11, thus heating both of the welding portions 16. When the welding portions 16 have been heated such that welding is possible, the hot plate is removed, and the body 1 is pressed onto the fuel tank 11 in order to weld and join both the body 1 and the fuel tank 11. In this case, the tip 21 of the protruding portion 20 of the body 1 protrudes beyond the welding portion 16 in an outward direction. As a result, during welding with the fuel tank 11, the tip 21 of the protruding portion 20 partially embeds within the outer shell 13 which composes an outer wall of the body 1. It goes without saying that this welding and joining may also be accomplished using methods other than a hot plate, such as, for example, vibration welding or ultrasonic welding.

By adopting this type of welding structure in the second embodiment, even if the body 1 and the insert molded resin 10 separate due to vibrations, differences in contraction rates when subjected to temperature variation, deterioration with time, or the like, the tip 21 of the protruding portion 20 is partially embedded into the outer shell 13 of the fuel tank 11 as shown in FIG. 8. As a result, it is possible to reduce leakage of fuel from this area. In addition, even if it is tentatively assumed, for example, that the connection of the tip 21 of the protruding portion 20 and the outer shell 13 is inadequate, a substantial detour is formed by the protruding portion 20, which also makes it possible to reduce fuel leakage.

Moreover, with regard to the problem of hydrocarbon gas permeation, it is possible to completely prevent leakage of hydrocarbon gases by the route indicated by the black arrow (5) in FIG. 5. In addition, it is also possible to prevent leakage of nearly all of hydrocarbon gases flowing within the outer shell 13 along the route indicated by the black arrow (6). Furthermore, the flows of other hydrocarbon gas are identical to those previously described in the first embodiment.

According to the structure of the second embodiment, the tip 21 of the protruding portion 20 is partially embedded within the outer shell 13 of the body 1. However, in the case that either the connection of the tip 21 of the protruding portion 20 and the outer shell 13 of the body 1, or the molding of the body 1 and the insert molded resin 10 is inadequate, or in the case of separation, leakage of fuel from this area is conceivable. Furthermore, permeation of hydrocarbon gases along the route indicated by the black arrow (6) (the route through the outer shell 13 between the tip 21 of the protruding portion 20 and upper bonding layer 15a) is also possible.

This fuel leakage can be prevented by lengthening the tip 21 of the protruding portion 20 such that it embeds as far as the upper bonding layer 15a. As a result, the tip 21 connects with the upper bonding layer 15a, which thus dramatically reduces the possibility of inadequate connection of the tip 21 or separation. However, since the upper bonding layer 15a is formed from modified high density polyethylene resin which permeates hydrocarbon gases, as previously described, an extremely small amount of hydrocarbon gases can permeate out via the upper bonding layer 15a between the upper surface of the barrier layer 14 and the tip 21 of the protruding portion 20, along the route shown by the black arrow (6).

Figure 9:
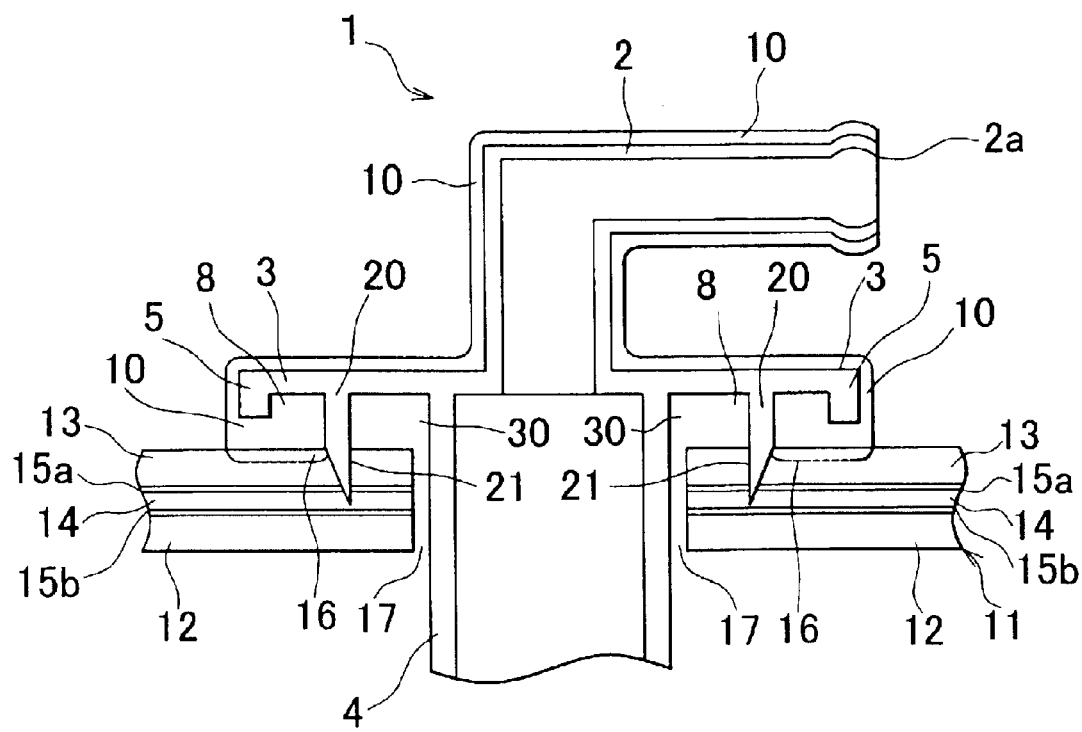
FIG. 9 is a cross sectional view of a modified form of the embodiment in FIG. 8, in a state where a protruding portion penetrates as far as a fuel permeation prevention layer.

FIG. 9 is a modified form of the embodiment shown in FIG. 8, in which the tip 21 of the protruding portion 20 is lengthened such that it passes through the upper bonding layer 15a and reaches the barrier layer 14. By adopting this structure, it is possible to reduce still further the amount of hydrocarbon gases which permeate out through the upper bonding layer 15a between the tip 21 of the protruding portion 20 and the barrier layer 14. The barrier layer 14 is formed from resin which does not permeate hydrocarbon gases and the tip 21 passes through the upper bonding layer 15a and penetrates as far as the barrier layer 14, such that the portion of the protruding portion 20 passing through the upper bonding layer 15a is firmly in connection with the upper bonding layer 15a. As a result, it is possible to significantly reduce fuel leakage.

Figure 10:
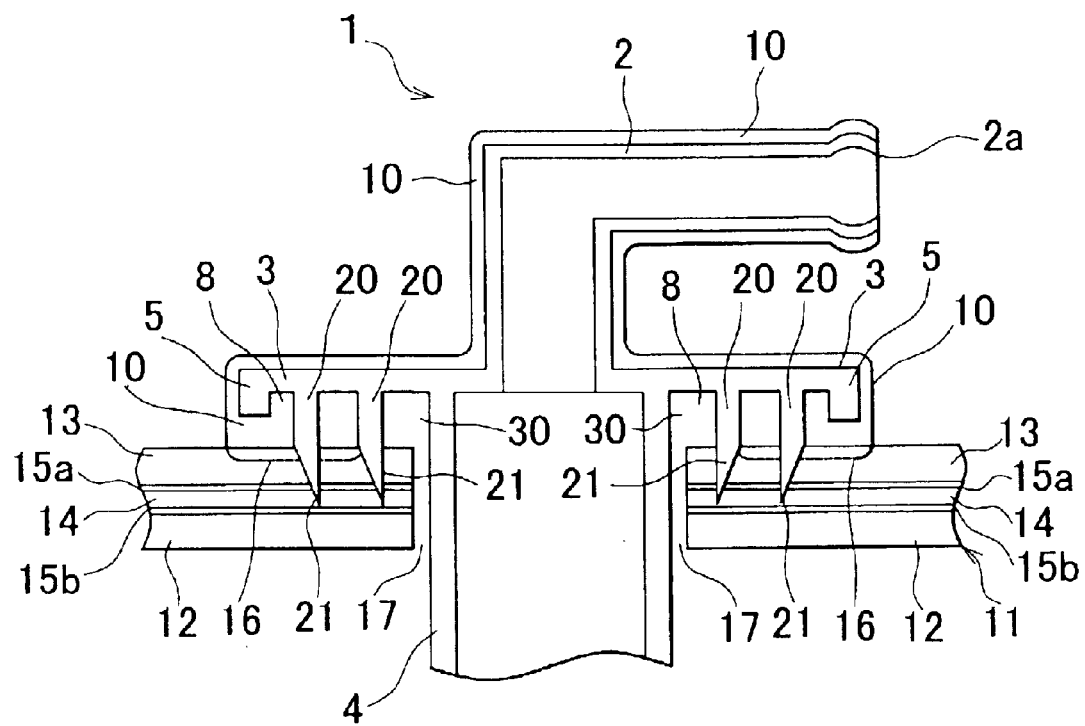
FIG. 10 is a cross sectional view of another modified form of the embodiment in FIG. 8, in a state where a plurality of protruding portions penetrate as far as a fuel permeation prevention layer.

FIG. 10 shows a modified form of the embodiment shown in FIG. 9, in which a plurality of protruding portions 20 which extend so as to reach the barrier layer 14 are provided. In this embodiment, two protruding portions 20 are formed. By adopting this structure, it is possible to reduce leakage of both fuel and hydrocarbon gases even further still.

Figure 11:
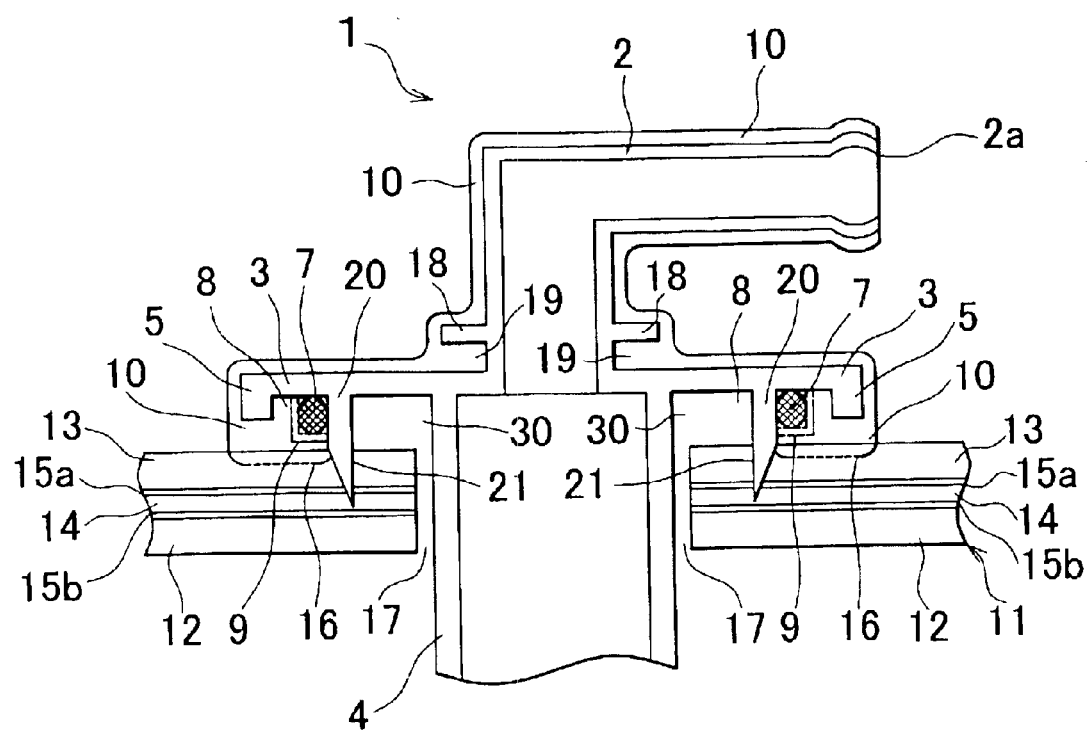
FIG. 11 is a cross sectional view showing the component for attachment to a fuel tank, in a state where the component has been thermal bonded to the fuel tank, according to yet another embodiment of the invention.
Figure 12:
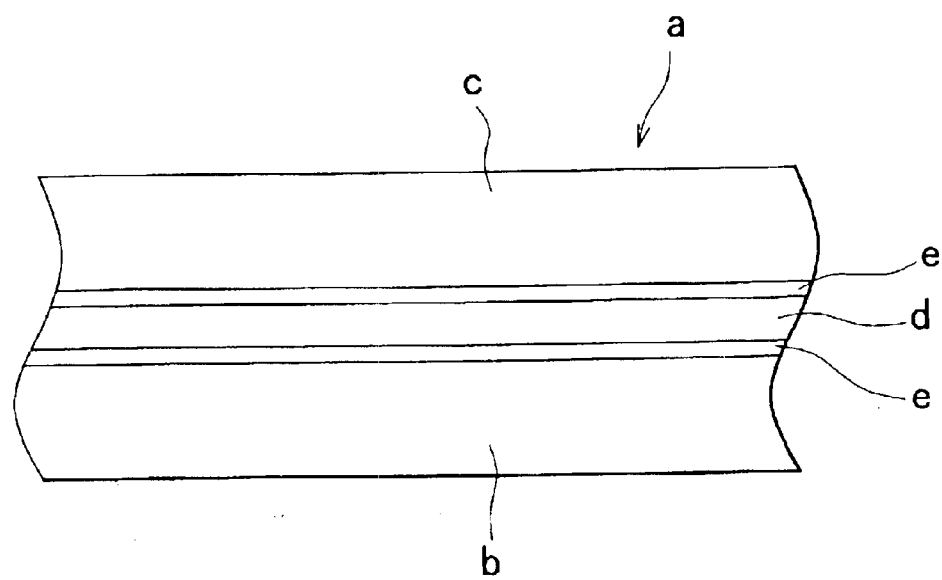
FIG. 12 is an enlarged cross sectional view of one part of the fuel tank.
Figure 13:
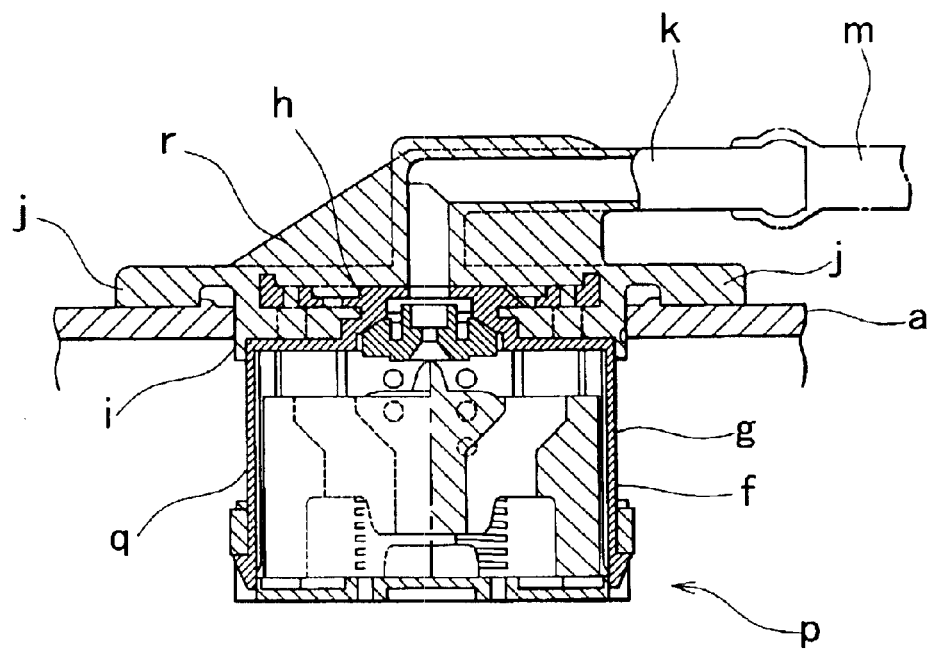
FIG. 13 is a cross sectional view of a conventional fuel tank and a component for attachment to the fuel tank.
Figure 14:
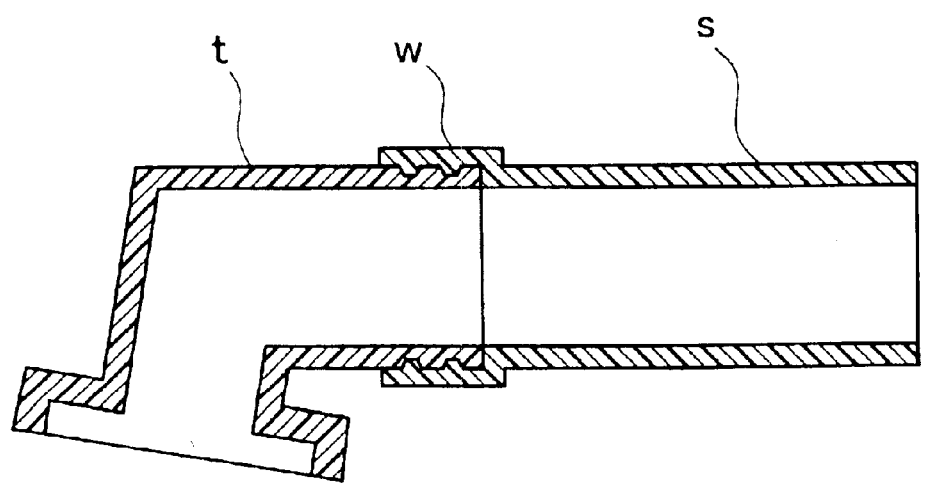
FIG. 14 is a cross sectional view of a conventional fuel tank and another component for attachment to the fuel tank.

FIG. 11 shows a welding structure for a resin component according to a third embodiment of the invention. The third embodiment adopts in tandem both the packing material, and the like, that characterizes the first embodiment, and the protruding portion that characterizes the second embodiment. The other structural details of the third embodiment are the same as either one of the first embodiment or the second embodiment.

The body 1 is formed from a material which is not easily permeated by hydrocarbons such as polyamide (PA), polyphenylene sulfide (PPS), poly buthylene terephthalete (PBT), polyacetal (POM), or the like. The body 1 is integrally formed from the pipe portion 2 connected to the connecting pipe, not shown, at the tip 2a of the pipe portion 2, the flange 3 having the welding portion for welding to the fuel tank at the lower surface of the body 1, and the cylindrical portion 4 disposed vertically from the center of the lower surface of the flange 3 which houses and locates members such as the valve member being a fuel tank cut valve, or the like, the pump, and the filter body.

The rib 18 is formed in the side wall portion of the pipe portion 2, thus forming the concave and recess portion 19 in the side wall portion. In addition, the ring shaped outer rib 5 and the ring shaped protruding portion 20 are formed vertically from the lower surface of the flange 3, thus forming the concave and recess portion 8. Furthermore, in contrast to the bottom surface of the outer rib 5 that is substantially flat, the tip 21 of the protruding portion 20 is pointed. The cross section of the tip 21 assumes a wedge shape. Furthermore, the tip 21 is insert molded such that it protrudes in an outward direction from the insert molded resin even after insert molding has been completed. The outer rib 5 and the protruding portion 20 are beneficial for effective attachment of the packing material, and joining of the insert molded resin and the flange 3.

For example, the insert molded resin 10 formed from the same high density polyethylene resin material as the fuel tank is provided using insert molding around the outer periphery of the body 1. However, the insert molded resin 10 may be provided around only the lower surface of the flange 3, or around only the welding portions 16 which is one portion of the lower surface of the flange 3, such that welding of the body 1 and the fuel tank is easier.

The fuel tank 11 has the same laminated structure as the first embodiment previously described. Namely, the fuel tank 11 is fundamentally composed from a five layer structure including the inner shell 12 forming the inside portion of the fuel tank 11, the outer shell 13 forming the outer portion of the fuel tank 11, the barrier layer 14 interposed between the shells 12 and 13 which prevents permeation of hydrocarbon gases, the upper bonding layer 15a sandwiched between the inner shell 12 and the barrier layer 14 and the lower bonding layer 15b sandwiched between the outer shell 13 and the barrier layer 14.

More specifically, the inner shell 12 and the outer shell 13 are formed from a known high density polyethylene resin, and the upper bonding layer 15a and the lower bonding layer 15b are formed from a modified high density polyethylene resin having adhesive properties which was developed by improvement of high density polyethylene resin (this resin has adhesive properties and permeates hydrocarbon gases). In addition, the barrier layer 14 adopts a resin that prevents permeation by hydrocarbon gases, such as EVOH resin (EVAL) made by Kuraray Co., Ltd.

The welding of the fuel tank 11 and the body 1 is executed in the following manner. The cylindrical portion 4 of the body 1 is inserted within the opening 17 provided on the fuel tank 11 such that the welding portion 16 of the fuel tank 11 and the welding portion 16 of the body 1 are adjacent to each other. Next, the hot plate, not shown, is inserted between the welding portion 16 of the body 1 and the welding portion 16 of the fuel tank 11, thus heating both of the welding portions 16. When the welding portions 16 have been heated such that welding is possible, the hot plate is removed, and the body 1 is pressed onto the fuel tank 11 in order to weld and join both the body 1 and the fuel tank 11. In this case, the tip 21 of the protruding portion 20 of the body 1 protrudes beyond the welding portions 16 in an outward direction. As a result, during welding with the fuel tank 11, the tip 21 of the protruding portion 20 passes through the outer shell 13 and the upper bonding layer 15a composing the outer wall of the body 1 and embeds within the barrier layer 14. It goes without saying that this welding and joining may also be accomplished using methods other than a hot plate, such as, for example, vibration welding or ultrasonic welding.

By adopting this type of welding structure in the third embodiment, even if the body 1 and the insert molded resin 10 separate due to vibrations, differences in contraction rates when subjected to temperature variation, deterioration with time, or the like, the tip 21 of the protruding portion 20 is embedded into the barrier layer 14 of the fuel tank 11 as shown in FIG. 11. Furthermore, the protruding portion 20 and the upper bonding layer 15a are firmly in connection, the concave and recess portion 19 is provided in the side wall portion, and the concave and recess portion 8 is provided in the lower surface. As a result of this, it is possible to reliably prevent the leakage of fuel.

Moreover, with regard to the problem of hydrocarbon gas permeation, the tip 21 of the protruding portion 20 passes through the upper bonding layer 15a and extends so as to reach the barrier layer 14. This makes it possible to reliably prevent leakage of hydrocarbon gases from the outer shell 13 of the fuel tank 11 and the upper bonding layer 15a.

The third embodiment is not, however, limited to the structure of the form described above. It is of course possible to undertake any suitable design modifications that remain within the scope of the spirit of the invention.

The welding structure of this embodiment includes the body formed from resin having low permeability to hydrocarbons, the packing material attached to the body also having low permeability to hydrocarbons, and the resin which is insert molded to at least a connecting portion of the body that connects with a connecting portion of the tank, and which is moldable to the fuel tank. As a result of this structure, the thermal welding of the body and the tank can be easily and reliably executed.

Furthermore, it is possible to reliably reduce permeation of hydrocarbon gases, by integrating the attachment portion and the valve cylinder portion using a resin having low permeability to hydrocarbon gases. Conventionally this was not possible since the component and fuel tank were made of different materials. Moreover, by providing packing material at the interface of the body and the insert molded resin, it is possible to reliably reduce leakage of fuel.

Moreover, as a result of both the adoption of packing material having the locking ring formed from the same resin as the insert molded resin, and provision of the plurality of packing materials, there is a strong connection interface between the body of the resin component and the insert molded resin. Accordingly, even if the interface connection of the elements to the upstream side of the packing materials is inadequate (for example, the interface of the flange and the resin), or there is separation due to deterioration over time, and thus fuel leakage may potentially occur, fuel is reliably prevented from leaking to the outside because it is reliably blocked by the locating of one or more packing materials.

In addition, leakage of fuel to the outside can also reliably be inhibited by the provision of a concave and recess portion in the body and also in the surface of the connecting portion side of the body that connects with the fuel tank.

Moreover, one of the other embodiments, includes the body formed of resin having low permeability to hydrocarbons, the protruding portions, formed in the surface of the connecting portion side of the body that connects with the fuel tank, which penetrate into the outer shell of the fuel tank during attachment to the fuel tank, and the resin which is insert molded to at least a connecting portion of the body that connects with a connecting portion of the tank, and which is weldable to the fuel tank. As a result the thermal welding of the body and the fuel tank can be executed with ease and reliability. Accordingly, it is possible to reduce production costs since the size of the connecting surface area can be reduced.

Furthermore, it is possible to reliably reduce permeation of hydrocarbon gases, by integrating the attachment portion and the valve cylinder portion using a resin having low permeability to hydrocarbon gases. Conventionally this was not possible since the component and fuel tank were made of different materials. Moreover, fuel leakage can also be reliably reduced by provision of the protruding portions in the body. As a result, it is possible to reduce production costs still further, since it is not even necessary to utilize separate members such as the packing materials.

Moreover, by penetrating the protruding portions as far as the connecting layer laminated on the top surface of the fuel permeation prevention layer, or still further, penetrating the protruding portion as far as the fuel permeation prevention layer itself, it is possible to inhibit fuel leakage caused by layer interface separation and permeation of hydrocarbon gas even more reliably.

Furthermore, the packing material having low permeability to hydrocarbon gases may be provided by being fixed to the body such that the packing material is interposed between the body and the insert molded resin. By fixing this packing material with the locking ring formed from the same resin as the insert molded resin, the seal of the interface between the body of the component and the insert molded resin is improved. As a result, even if the interface connection of the elements to the upstream side of the packing material is inadequate (for example, the interface of the flange and the resin), or there is separation due to deterioration over time, and thus fuel leakage may potentially occur, fuel is reliably inhibited from leaking to the downstream side of the packing material because fuel leakage is reliably inhibited by the location of the packing material.

Moreover, the protruding portions may be penetrated as far as the fuel permeation prevention layer, and in this case, fuel leakage due to layer interface separation, and furthermore, permeation of hydrocarbon gases, is inhibited.

What is claimed is:

1. A welding structure for resin components comprising:
   a fuel tank including a resin inner shell and a resin outer shell interposed by a fuel permeation prevention layer such that they are laminated: and
   a resin component attached to the fuel tank including;
      a body formed of a resin having low permeability to hydrocarbon gases; and
      a resin which is insert molded to at least a connecting portion of the body that connects with a connecting portion of the tank, and which is weldable to the fuel tank; and
      a packing material having low permeability to hydrocarbon gases which is fixed to the body such that the packing material is interposed between the body and the insert molded resin.

2. The welding structure according to claim 1 wherein;
   the packing material is fixed by a locking ring formed from the same material as the insert molded resin.

3. The welding structure according to claim 1 wherein;
   a plurality of packing materials are provided in a plurality of locations.

4. The welding structure according to claim 1 wherein;
   the body of the resin component has a concave and recess portion.

5. The welding structure according to claim 4 wherein;
   the concave and recess portion is provided on the surface of a connecting portion side of the body that connects with the fuel tank, and the packing material is provided in the recess portion.

6. A welding structure for resin components comprising:
   a fuel tank including a resin inner shell and a resin outer shell interposed by a fuel permeation prevention layer such that they are laminated: and
   a resin component attached to the fuel tank including;
      a body formed of a resin having low permeability to hydrocarbon gases; and
      a protruding portion provided in the surface of a connecting portion side of the body which connects with the fuel tank, which is penetrated in the outer shell of the fuel tank when the body is attached to the fuel tank; and
      a resin which is insert molded to at least the connecting portion of the body that connects with a connecting portion of the tank, and which is weldable to the fuel tank.

7. The welding structure according to claim 6 wherein;
   the fuel tank includes a bonding layer interposed between the resin outer shell and the fuel permeation prevention layer,
   the protruding portion is formed such that the protruding portion penetrates as far as the bonding layer.

8. The welding structure according to claim 6 wherein;
   the protruding portion is formed such that the protruding portion penetrates as far as the fuel permeation prevention layer.

9. The welding structure according to claim 6 further comprising;
   a packing material having low permeability to hydrocarbon gases and being fixed to the body such that the packing material is interposed between the body of the resin component and the insert molded resin.

10. The welding structure according to claim 9 wherein;
    the packing material is fixed using a locking ring formed from the same resin as the insert molded resin.

* * * * *